US008765619B2

(12) United States Patent
Brunet et al.

(10) Patent No.: US 8,765,619 B2
(45) Date of Patent: Jul. 1, 2014

(54) GLASS-CERAMIC PLATE

(75) Inventors: Edouard Brunet, Paris (FR); Marie Helene Chopinet, Paris (FR)

(73) Assignee: Eurokera S.N.C., Jouarre (FR)

( * ) Notice: Subject to any disclaimer, the term of this patent is extended or adjusted under 35 U.S.C. 154(b) by 63 days.

(21) Appl. No.: 13/319,576

(22) PCT Filed: May 28, 2010

(86) PCT No.: PCT/FR2010/051028
§ 371 (c)(1),
(2), (4) Date: Nov. 9, 2011

(87) PCT Pub. No.: WO2010/136731
PCT Pub. Date: Feb. 12, 2010

(65) Prior Publication Data

US 2012/0085336 A1 Apr. 12, 2012

(30) Foreign Application Priority Data

May 29, 2009 (FR) .................................... 09 53558
Jul. 3, 2009 (FR) .................................... 09 54620
Apr. 1, 2010 (FR) .................................... 10 52474

(51) Int. Cl.
*C03C 10/12* (2006.01)
*C03C 10/14* (2006.01)
*C03C 4/08* (2006.01)
*C03C 4/10* (2006.01)
*C03C 10/00* (2006.01)
*C03B 32/02* (2006.01)

(52) U.S. Cl.
CPC ... *C03C 4/08* (2013.01); *C03C 4/10* (2013.01); *C03C 10/0027* (2013.01); *C03B 32/02* (2013.01)
USPC ...................... 501/4; 501/7; 65/33.7; 65/33.8

(58) Field of Classification Search
CPC .......... C03C 4/08; C03C 4/10; C03C 10/0027
USPC .................................. 501/4, 7; 65/33.7, 33.8
See application file for complete search history.

(56) References Cited

U.S. PATENT DOCUMENTS

| | | | | |
|---|---|---|---|---|
| 3,788,865 | A | 1/1974 | Babcock et al. | |
| 4,835,121 | A * | 5/1989 | Shibuya et al. | 501/4 |
| 7,456,121 | B2 * | 11/2008 | Comte | 501/4 |
| 7,465,686 | B2 * | 12/2008 | Comte | 501/4 |
| 7,476,633 | B2 * | 1/2009 | Comte et al. | 501/7 |
| 7,507,681 | B2 * | 3/2009 | Aitken et al. | 501/4 |
| 8,127,571 | B2 * | 3/2012 | Martin et al. | 65/134.1 |
| 8,198,201 | B2 * | 6/2012 | Comte et al. | 501/4 |
| 2005/0252503 | A1 * | 11/2005 | Siebers et al. | 126/1 R |
| 2007/0004578 | A1 * | 1/2007 | Monique Comte | 501/4 |
| 2007/0213192 | A1 * | 9/2007 | Monique Comte et al. | 501/7 |
| 2008/0026927 | A1 * | 1/2008 | Monique Comte | 501/7 |
| 2008/0207424 | A1 * | 8/2008 | Aitken et al. | 501/10 |

FOREIGN PATENT DOCUMENTS

| | | | |
|---|---|---|---|
| DE | 2008001708 | * | 6/2009 |
| FR | 2 612 510 | A1 | 9/1988 |
| FR | 2 902 420 | A1 | 12/2007 |
| JP | 11-100229 | | 4/1999 |
| JP | 11-100230 | | 4/1999 |
| JP | 11-100231 | | 4/1999 |
| WO | 2008053110 | * | 5/2008 |
| WO | WO 2008/053110 | A2 | 5/2008 |

OTHER PUBLICATIONS

International Search Report issued Apr. 15, 2011, in PCT/FR2010/051028.

* cited by examiner

*Primary Examiner* — Karl Group
(74) *Attorney, Agent, or Firm* — Oblon, Spivak, McClelland, Maier & Neustadt, L.L.P.

(57) ABSTRACT

A glass-ceramic plate of lithium aluminosilicate free of arsenic and antimony, the optical transmission of which, for a thickness of 4 mm, is between 0.2 and 4% for at least one wavelength between 400 and 500 nm.

18 Claims, No Drawings

GLASS-CERAMIC PLATE

The invention relates to the field of glass-ceramics.

It relates more specifically to a glass-ceramic plate of the lithium aluminosilicate type.

Such glass-ceramics are especially intended to be used as kitchen articles, in particular as cooktops covering heating elements, such as halogen or radiant heat sources, or as cooking utensils.

If glass-ceramics of the lithium aluminosilicate type prove to be very suitable for these uses, it is thanks to their esthetic appearance, which can be varied to a large extent, to their mechanical properties, especially to the high impact strength owing to their low coefficient of thermal expansion within the range of temperatures at which they are used, and to their chemical properties, namely resistance to both acids and bases.

Conventionally, the production of glass-ceramic takes place in several steps: a) melting of the glass batch materials containing at least one nucleating agent; b) forming and cooling of the glass—known as "mother glass"—down to a temperature lower than its conversion range; and c) heat treatment to ceramize the glass.

This heat treatment, known as "ceramization", makes it possible to grow, within the glass, crystals of ⊕-quartz or β-spodumene structure (depending on the ceramization temperature), which have the distinctive feature of possessing negative coefficients of thermal expansion.

The presence, in the final glass-ceramic, of such crystals and of a residual glassy phase, makes it possible to obtain a coefficient of thermal expansion that on the whole is zero or very low (the absolute value of the expansion coefficient is typically less than or equal to $15\times10^{-7}/°$ C., or even $5\times10^{-7}/°$ C.). The size of the crystals of β-quartz structure is generally very low so as not to scatter visible light.

Glass-ceramics also possess specific optical properties that depend on their use. Thus, in the case of a cooking plate, it is important for the glass-ceramic to have a low light transmission capability so that the user cannot, or can only with difficulty, distinguish the underlying heating elements when they are not operating. However, at the same time, the cooking plate must allow the elements to be seen when they are heating, without however dazzling the user, so as to reduce the risk of burns on contact with the hot plate. The glass-ceramic must also have good energy transmission properties, in particular for transmitting the infrared radiation produced by the heating elements in order to bring the food to the desired temperature in as short a time as possible.

Current cooking plates are generally colored using vanadium oxide. Vanadium oxide is added to the batch materials of the mother glass before melting, and it gives, after ceramization, a very deep orange-brown color, linked to a reduction of the vanadium.

These glass-ceramics colored with vanadium oxide allow wavelengths located in the red range (above 600 nm) to pass through, so that the heating elements are visible when they are brought to high temperature. The displays produced using light-emitting diodes that emit in the red range are also visible through the cooking plate.

For esthetic reasons, a need to also be able to visualize displays of different colors, especially blue, has recently arisen.

Application EP-A-1 465 460 seeks to solve this problem by proposing glass-ceramics for which the light transmission Y, integrated over the entire visible spectrum, is greater than or equal to 2.5%, and may range up to 15%, for a thickness of 3 mm.

This solution is not however without drawbacks since such high transmissions result in the possibility of seeing the presence of the underlying heating elements even when no heating is taking place. Moreover, the aforementioned application recommends the use of a mother glass that is oxidized in order to reduce the coloration due to the vanadium oxide. It is however apparent to the inventors that by proceeding in such a way, the vanadium oxide is not completely reduced during the ceramization step, and that it continues to be reduced over the course of the use of the cooking plate, due to the high temperatures experienced by the plate. This results in an ageing phenomenon during which the plate gradually darkens. Moreover, the compositions proposed contain arsenic and/or antimony, which poses toxicity problems.

The objective of the invention is to overcome these drawbacks by proposing a glass-ceramic plate of lithium aluminosilicate type free of arsenic and of antimony, the optical transmission of which, for a thickness of 4 mm, is between 0.2 and 4% for at least one wavelength between 400 and 500 nm.

The plate according to the invention is especially a cooking plate, intended to be integrated into a cooktop, the latter comprising the cooking plate and the heating elements, for example radiant or halogen heat sources or induction elements. The cooktop preferably comprises displays based on light-emitting diodes, in particular that emit in the blue region.

The optical transmission, for a thickness of 4 mm, is preferably between 0.4 and 1.5% for at least one wavelength between 400 and 500 mm.

Advantageously, the optical transmission, for a thickness of 4 mm, is preferably between 0.2 and 4%, in particular between 0.4 and 1.5% for any wavelength between 400 and 500 nm.

In this way, it is possible not only to visualize displays produced with the aid of blue or green light-emitting diodes, but also to visualize them with no major distortion of their color. To prevent any distortion, it is preferable to have a relatively flat transmission spectrum between 450 and 500 nm. The difference between the highest transmission and the lowest transmission in the range of wavelengths going from 450 to 500 nm is advantageously less than or equal to 0.5%, or 0.2% and even 0.1%.

Higher transmissions would lead to visualization of the heating elements even outside of a heating period, which should be precluded. For lower transmissions on the other hand, the visibility of the blue or green displays is too low.

The light transmission, within the meaning of the ISO 9050: 2003 standard, is preferably less than or equal to 3%, or to 2% and even to 1% for a 4 mm-thick plate. In this way, the heating elements are not visible when they are switched off.

The term "transmission" is understood to mean the total transmission, taking into account both the direct transmission and the possible diffuse transmission. Therefore, use is preferably made of a spectro-photometer equipped with an integrating sphere. In the case of a glass-ceramic plate that possesses periodic raised features (especially studs) on at least one face, the thickness of the plate takes into account these raised features. The transmission measured at a given thickness is then converted to the reference thickness of 4 mm according to methods known to a person skilled in the art, included in particular in the ISO 9050: 2003 standard.

The expression "glass-ceramic of the lithium aluminosilicate type" is preferably understood to mean a glass-ceramic which comprises the following constituents within the limits defined below, which are expressed as percentages by weight:

| | |
|---|---|
| $SiO_2$ | 52-75% |
| $Al_2O_3$ | 18-27% |
| $Li_2O$ | 2.5-5.5% |
| $K_2O$ | 0-3% |
| $Na_2O$ | 0-3% |
| ZnO | 0-3.5% |
| MgO | 0-3% |
| CaO | 0-2.5% |
| BaO | 0-3.5% |
| SrO | 0-2% |
| $TiO_2$ | 1.2-5.5% |
| $ZrO_2$ | 0-3% |
| $P_2O_5$ | 0-8%. |

This glass-ceramic may comprise up to 1% by weight of non-essential constituents that do not adversely affect the melting of the mother glass or the subsequent devitrification that results in the glass-ceramic.

Preferably, the glass-ceramic of the lithium alumino-silicate type comprises the following constituents within the limits defined below, expressed as percentages by weight:

| | |
|---|---|
| $SiO_2$ | 64-70% |
| $Al_2O_3$ | 18-19.8% |
| $Li_2O$ | 2.5-3.8% |
| $K_2O$ | 0-<1.0% |
| $Na_2O$ | 0-<1.0% |
| ZnO | 1.2-2.8% |
| MgO | 0.55-1.5% |
| CaO | 0-1% |
| BaO | 0-3% |
| SrO | 0-1.4% |
| $TiO_2$ | 1.8-3.2% |
| $ZrO_2$ | 1.0-2.5%. |

The barium oxide content is preferably between 1 and 3%, especially between 2 and 3% in order to reduce the viscosity of the glass. For the same reason, the silica content is preferably less than or equal to 68%, especially 67% or even 66%. The inventors have also been able to demonstrate a very strong effect of the lime (CaO) content on the reduction in the viscosity, even for very low contents added. For this reason, the CaO content is at least 0.2%, especially 0.3% and even 0.4%.

The best results are obtained for alumina ($Al_2O_3$) contents of less than or equal to 19.5%, especially 19%.

The chemical composition of the plate according to the invention preferably comprises vanadium oxide in a weight content between 0.01 and 0.1%. This content is even preferably less than or equal to 0.05%, even 0.04 or 0.03% or else 0.025 or 0.02%. The preferred vanadium oxide contents are between 0.01 and 0.03%.

High vanadium oxide contents lead to a darkening of the plate and consequently a low visibility of the display, in particular in the blue region. Lower contents make it possible, on the other hand, to lighten the cooking plate.

In order to thoroughly hide the heating elements, the plate according to the invention may also contain, in particular in combination with vanadium oxide, the following coloring agents, within the following limits by weight:

| | |
|---|---|
| $Fe_2O_3$ | 0-1% |
| NiO | 0-1% |
| CuO | 0-1% |
| MnO | 0-1% |

the sum of the percentages of these coloring agents being at least equal to 0.02%, preferably at least equal to 0.045% and not exceeding 2%. Preferably, the cooking plate according to the invention does not however contain cobalt oxide and nickel oxide, including when the vanadium oxide content is between 0.01 and 0.03%. Chromium oxide ($Cr_2O_3$) is an impurity which is frequently widespread in most batch materials, in particular carriers of rutile-type titania. Moreover, certain refractory materials constituting the melting furnaces may contain chromium oxide or be constituted of chromium oxide. In order to obtain the desired properties, it is highly preferable that the weight content of chromium oxide in the plate according to the invention be less than or equal to 25 ppm (1 ppm=0.0001% by weight), in particular 20 ppm and even 15 ppm, or 10 ppm or even 5 ppm. A limitation to such low contents makes it necessary to carefully select the batch materials and to avoid the presence of refractory materials made of chromium oxide in contact with the molten glass.

The chemical composition of the plate according to the invention may comprise tin oxide in a weight content between 0.1 and 0.5%. Specifically, tin oxide makes it possible to promote the reduction of the vanadium during the ceramization step, which results in the appearance of the color. Moreover, it helps to refine the mother glass during the melting of the latter, that is to say to promote the removal of gaseous inclusions within the mass of molten glass. Reducing agents other than tin have proved to be even more effective, especially metal sulfides, as explained in more detail in the remainder of the text. The chemical composition of the cooking plate according to the invention may therefore be free of tin oxide.

The chemical composition of the plate according to the invention is free of antimony and of arsenic, for environmental reasons and because these oxides have proved to be incompatible with a forming process of the float type, in which molten glass is poured onto a molten tin bath.

The glass-ceramic according to the invention preferably comprises crystals of β-quartz structure within a residual glassy phase. The absolute value of its expansion coefficient is typically less than or equal to $15\times10^{-7}$/° C., or even $5\times10^{-7}$/° C.

Another subject of the invention is a process for obtaining a plate according to the invention. This process comprises a step of melting and of refining a mother glass, then a ceramization step.

The melting is preferably carried out in a glass-melting furnace, with the aid of at least one burner. Batch materials (silica, spodumene, etc.) are introduced into the furnace and undergo, under the effect of the high temperatures, various chemical reactions, such as reactions of decarbonation, of melting itself, etc.

The refining step corresponds to the removal of gaseous inclusions trapped within the mass of molten glass. The refining is generally carried out at a temperature at least equal to the melting temperature, by virtue of the generation of bubbles which will entrain the undesirable inclusions to the surface of the mass of molten glass.

The refining may especially be carried out using tin oxide, introduced in the form of stannic oxide. The high-temperature reduction of the stannic oxide to stannous oxide will generate a great release of oxygen that is the origin of the refining. The stannous oxide will then be used to reduce the vanadium oxide during the ceramization step.

The refining is preferably carried out by virtue of the addition of a metal sulfide. The sulfide is also used to obtain a reduced mother glass, which during the ceramization will contribute to the overall reduction of the vanadium oxide. In the case of refining using a sulfide, the composition according to the invention may also comprise tin oxide, at contents indicated above; preferably however it does not contain any thereof.

The metal sulfide is preferably chosen from transition metal sulfides, for example zinc sulfide, alkali metal sulfides, for example potassium sulfide, sodium sulfide and lithium sulfide, alkaline-earth metal sulfides, for example calcium sulfide, barium sulfide, magnesium sulfide and strontium sulfide. The preferred sulfides are zinc sulfide, lithium sulfide, barium sulfide, magnesium sulfide and strontium sulfide. Zinc sulfide has proved to be particularly advantageous since it does not contribute to coloring the glass or the glass-ceramic. It is also favored when the glass-ceramic must contain zinc oxide: in this case the zinc sulfide plays a double role of reducing agent/refining agent and of source of zinc oxide.

The sulfide may also be introduced into the glass batch materials in the form of a slag or a sulfide-enriched glass frit, which have the advantage of accelerating the digestion of stones, of improving the chemical homogeneity of the glass and its optical quality. However, it is well known that slags also contain iron in a substantial amount, which reduces the infrared transmission. From this standpoint, it is preferable to use glass frits of which the chemical composition, especially the iron content, may be perfectly controlled.

Preferably, the sulfide is added to the glass batch materials in an amount of less than 2%, advantageously less than 1% and better still between 0.07 and 0.8% of the total weight of the glass batch materials. Contents between 0.3 and 0.7% are preferred.

To fully perform its refining role, the sulfide, especially zinc sulfide, is preferably combined with a reducing agent such as coke. The coke content introduced is preferably between 800 and 2000 ppm, in particular between 1200 and 1800 ppm (1 ppm=0.0001% by weight).

The sulfide may also be combined with an oxidizing agent, preferably a sulfate. Sulfates have the advantage of not forming coloring species in the glass or the glass-ceramic. The sulfate may especially be a sodium, lithium or else magnesium sulfate. The sulfate contents introduced are preferably between 0.2 and 1% by weight, in particular between 0.4 and 0.8%, expressed as $SO_3$.

The melting and the refining of the mother glass are preferably carried out at temperatures of less than or equal to 1700° C., in particular 1650° C. and even 1600° C.

After the refining step, the mother glass obtained is treated under customary conditions for producing a glass-ceramic.

Thus, the glass is formed, for example in the form of a ribbon under the conditions of the float process, in which the molten glass floats on a bath of molten tin, and then said ribbon is cut into plates, or directly in plate form by rolling, or else molded to the desired shape.

The formed glass then undergoes a heat treatment for the purpose of converting it to a glass-ceramic.

During the ceramization step, the mother glass may in particular undergo a ceramization cycle comprising the following steps:

a) raising the temperature to the nucleation range, generally located close to the conversion range, especially at 50-80° C. per minute;

b) passing through the nucleation range (670-800° C.) in around twenty minutes;

c) raising the temperature to the temperature T of the ceramization plateau between 900 and 1000° C. in 15 to 30 minutes;

d) maintaining the temperature T of the ceramization plateau for a time t of 10 to 25 minutes; and e) rapid cooling down to ambient temperature.

Another subject of the invention is a cooktop comprising a cooking plate according to the invention or obtained by the process according to the invention, and at least one heating element, for example a radiant or halogen heat source or an induction element. The cooktop preferably comprises displays based on light-emitting diodes, especially that emit in the blue range.

The invention will be better understood in light of the following non-limiting examples.

Melted in a furnace heated using oxygen/natural gas burners are various mother glasses, having the compositions indicated in Table 1 below. The melting temperature is of the order of 1650° C. The mother glass formed into a plate by rolling then undergoes a ceramization treatment in order to form a glass-ceramic, this treatment being carried out according to the cycle comprising the steps a) to e) described previously.

The table indicates the weight contents of oxides, the optional content of coke or of zinc sulfide added to the glass batch, and the optical transmission at 450 and 500 nm for a thickness of 4 mm.

The composition C1 (comparative example) is a glass-ceramic, the very low transmissions of which between 450 and 500 nm result in an almost zero visibility of the blue light-emitting diodes.

The compositions 1 to 4 are examples according to the invention.

TABLE 1

| | C1 | 1 | 2 | 3 | 4 |
|---|---|---|---|---|---|
| $SiO_2$ | 67.7 | 64.7 | 64.7 | 64.7 | 64.7 |
| $Al_2O_3$ | 21.2 | 18.8 | 18.8 | 18.8 | 18.8 |
| $Li_2O$ | 3.5 | 3.8 | 3.8 | 3.8 | 3.8 |
| $TiO_2$ | 2.5 | 3.0 | 3.0 | 3.0 | 3.0 |
| $ZrO_2$ | 1.8 | 1.4 | 1.4 | 1.4 | 1.4 |
| ZnO | 1.8 | 1.5 | 1.5 | 1.5 | 1.5 |
| MgO | 1.0 | 1.1 | 1.1 | 1.1 | 1.1 |
| CaO | — | 0.4 | 0.4 | 0.4 | 0.4 |
| BaO | — | 2.5 | 2.5 | 2.5 | 2.5 |
| $Na_2O$ | 0.5 | 0.6 | 0.6 | 0.6 | 0.6 |
| $K_2O$ | 0.1 | 0.3 | 0.3 | 0.3 | 0.3 |
| MnO | — | 0.025 | 0.025 | 0.025 | — |
| $SnO_2$ | 0.22 | 0.25 | 0.25 | 0.25 | 0.25 |
| $V_2O_5$ | 0.065 | 0.025 | 0.025 | 0.025 | 0.025 |
| ZnS | | | | 0.02% | |
| Coke (ppm) | — | — | 400 | — | — |
| T (450 nm) | 0.1% | 0.8% | 0.6% | 0.5% | 0.4% |
| T (500 nm) | 0.18% | 1.1% | 0.9% | 0.7% | 0.5% |
| Blue LED visibility | No | Good | Good | Good | Good |

The invention claimed is:

1. A glass-ceramic plate, comprising:

lithium aluminosilicate comprising no arsenic and no antimony, vanadium oxide in a weight content between 0.01 and 0.03%, tin oxide in a weight content between 0.1and 0.5%, at least one of $Fe_2O_3$, NiO, and MnO in a weight content of at least 0.045%, no cobalt oxide, and β-quartz crystals, wherein the plate has an optical transmission, for a thickness of 4 mm, between 0.2 and 4% for any wavelength between 400 and 500 nm.

2. The plate of claim 1, having an optical transmission, for a thickness of 4 mm, between 0.4 and 1.5% for any wavelength between 400 and 500 nm.

3. The plate of claim 1, wherein the lithium aluminosilicate comprises, expressed as percentages by weight:

| | |
|---|---|
| $SiO_2$ | 52-75%; |
| $Al_2O_3$ | 18-27%; |
| $Li_2O$ | 2.5-5.5%; |
| $K_2O$ | 0-3%; |
| $Na_2O$ | 0-3%; |
| ZnO | 0-3.5%; |
| MgO | 0-3%; |
| CaO | 0-2.5%; |
| BaO | 0-3.5%; |
| SrO | 0-2%; |
| $TiO_2$ | 1.2-5.5%; |
| $ZrO_2$ | 0-3%; and |
| $P_2O_5$ | 0-8%. |

4. The plate of claim 3, wherein the lithium aluminosilicate comprises, expressed as percentages by weight:

| | |
|---|---|
| $SiO_2$ | 64-70%; |
| $Al_2O_3$ | 18-19.8%; |
| $Li_2O$ | 2.5-3.8%; |
| $K_2O$ | 0-<1.0%; |
| $Na_2O$ | 0-<1.0%; |
| ZnO | 1.2-2.8%; |
| MgO | 0.55-1.5%; |
| CaO | 0-1%; |
| BaO | 0-3%; |
| SrO | 0-1.4%; |
| $TiO_2$ | 1.8-3.2 %; and |
| $ZrO_2$ | 1.0-2.5%. |

5. The plate of claim 1, wherein the plate comprises no nickel oxide.

6. The plate of claim 1, further comprising a weight content of chromium oxide less than or equal to 25 ppm.

7. A process for producing the plate of claim 1, the process comprising:

melting a mother glass;

refining the mother glass; and then, ceramizing the mother glass.

8. The process of claim 7, wherein the refining is carried out by an addition of a metal sulfide.

9. The process of claim 7, wherein the melting and the refining are carried out at a temperature of less than or equal to 1700° C.

10. A cooktop, comprising:

the plate of claim 1; and at least one heating element.

11. The plate of claim 1, further comprising a weight content of chromium oxide less than or equal to 20 ppm.

12. The plate of claim 1, further comprising a weight content of chromium oxide less than or equal to 15 ppm.

13. The plate of claim 1, further comprising a weight content of chromium oxide less than or equal to 10 ppm.

14. The process of claim 7, wherein the refining is carried out by an addition of zinc sulfide.

15. The process of claim 7, wherein the melting and the refining are carried out at a temperature less than or equal to 1650° C.

16. A cooktop, comprising at least one heating element and a plate obtained by the process of claim 7.

17. The plate of claim 1, wherein the lithium aluminosilicate comprises CaO, MnO or a combination thereof.

18. The plate of claim 1, comprising at least one of $Fe_2O_3$, NiO, CuO and MnO in a weight content of 0.045% to 2%.

* * * * *